(12) United States Patent
Lee et al.

(10) Patent No.: US 9,171,409 B2
(45) Date of Patent: Oct. 27, 2015

(54) SYSTEM AND METHOD FOR VEHICLE DRIVING STYLE DETERMINATION (75) Inventors: Jin-Woo Lee, Rochester Hills, MI (US); Bakhtiar Brian Litkouhi, Washington, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 285 days.

(21) Appl. No.: 13/100,930

(22) Filed: May 4, 2011

(65) Prior Publication Data

US 2012/0283893 A1 Nov. 8, 2012

(51) Int. Cl.
*G06G 7/70* (2006.01)
*G07C 5/08* (2006.01)
*G07C 5/00* (2006.01)
*G06F 17/00* (2006.01)

(52) U.S. Cl.
CPC .............. *G07C 5/085* (2013.01); *G07C 5/008* (2013.01); *G06F 17/00* (2013.01)

(58) Field of Classification Search
USPC ............. 340/441, 425.5, 901, 438–439; 701/33.4, 34.2, 33.7–33.8, 33.3, 93, 701/102; 705/4, 11
See application file for complete search history.

(56) References Cited

U.S. PATENT DOCUMENTS

| 4,671,111 | A | * | 6/1987 | Lemelson | 73/432.1 |
| 5,514,046 | A | * | 5/1996 | Petersmann et al. | 477/39 |
| 5,557,521 | A | * | 9/1996 | Danz et al. | 701/57 |
| 5,570,087 | A | * | 10/1996 | Lemelson | 340/870.05 |
| 6,438,472 | B1 | * | 8/2002 | Tano et al. | 701/29.6 |
| 7,383,154 | B2 | | 6/2008 | Tate, Jr. | |
| 7,509,194 | B2 | | 3/2009 | Wheals et al. | |
| 7,561,054 | B2 | * | 7/2009 | Raz et al. | 340/576 |
| 7,821,421 | B2 | * | 10/2010 | Tamir et al. | 340/901 |
| 7,831,407 | B2 | | 11/2010 | Huang et al. | |
| 8,085,166 | B2 | * | 12/2011 | Tamir et al. | 340/901 |
| 8,538,785 | B2 | * | 9/2013 | Coleman et al. | 705/4 |
| 8,543,287 | B2 | * | 9/2013 | Stevens et al. | 701/33.4 |
| 8,738,523 | B1 | * | 5/2014 | Sanchez et al. | 705/39 |
| 8,744,692 | B2 | * | 6/2014 | Carresjo et al. | 701/48 |

(Continued)

FOREIGN PATENT DOCUMENTS

DE 102008055656 5/2010
EP 2165321 A1 * 3/2010

(Continued)

OTHER PUBLICATIONS

On the Stability and Agility of Aggressive Vehicle Maneuvers: A Pendulum-Turn Maneuver Example; Jingang Yi; Jingliang Li; Jianbo Lu; Zhaodu Liu; Control Systems Technology, IEEE Transactions on; vol. 20 , Issue: 3; Topic(s): Signal Processing & Analysis; Digital Object Identifier: 10.1109/TCST.2011.2121908; Pub. Year: 2012 , pp. 663-676.*

(Continued)

*Primary Examiner* — Cuong H Nguyen
(74) *Attorney, Agent, or Firm* — Mark S. Cohen; Pearl Cohen; Zedek Latzer Baratz LLP (57) ABSTRACT

In one embodiment, a system and method may collect acceleration data for a driver for a vehicle, compare the acceleration data for the driver to a set of acceleration data representing a plurality of sample drivers driving in the same type of vehicle as the vehicle, and based on the comparison, determining a driving style rating for the driver.

21 Claims, 5 Drawing Sheets

(56) References Cited

U.S. PATENT DOCUMENTS

| | | | |
|---|---|---|---|
| 8,781,882 B1* | 7/2014 | Arboletti et al. | 705/7.39 |
| 9,067,565 B2* | 6/2015 | McClellan et al. | 1/1 |
| 9,087,099 B2* | 7/2015 | Camacho et al. | 1/1 |
| 2004/0225557 A1* | 11/2004 | Phelan et al. | 705/11 |
| 2005/0096836 A1* | 5/2005 | Minami et al. | 701/123 |
| 2005/0137757 A1* | 6/2005 | Phelan et al. | 701/1 |
| 2005/0182538 A1* | 8/2005 | Phelan et al. | 701/35 |
| 2006/0106515 A1* | 5/2006 | Phelan et al. | 701/35 |
| 2006/0111817 A1* | 5/2006 | Phelan et al. | 701/1 |
| 2006/0122749 A1* | 6/2006 | Phelan et al. | 701/35 |
| 2007/0001831 A1* | 1/2007 | Raz et al. | 340/439 |
| 2007/0027583 A1* | 2/2007 | Tamir et al. | 701/1 |
| 2008/0255722 A1* | 10/2008 | McClellan et al. | 701/35 |
| 2008/0255869 A1* | 10/2008 | Young et al. | 705/1 |
| 2008/0319602 A1* | 12/2008 | McClellan et al. | 701/33 |
| 2009/0118096 A1* | 5/2009 | Boutell | 477/120 |
| 2009/0198396 A1 | 8/2009 | Rodriguez et al. | |
| 2009/0240391 A1 | 9/2009 | Duddle et al. | |
| 2009/0306866 A1 | 12/2009 | Malikopoulos | |
| 2010/0019964 A1 | 1/2010 | Huang et al. | |
| 2010/0023180 A1 | 1/2010 | Huang et al. | |
| 2010/0023181 A1 | 1/2010 | Huang et al. | |
| 2010/0023182 A1 | 1/2010 | Huang et al. | |
| 2010/0023183 A1 | 1/2010 | Huang et al. | |
| 2010/0023196 A1 | 1/2010 | Huang et al. | |
| 2010/0023197 A1 | 1/2010 | Huang et al. | |
| 2010/0023216 A1 | 1/2010 | Huang et al. | |
| 2010/0023265 A1 | 1/2010 | Huang et al. | |
| 2010/0030458 A1 | 2/2010 | Coughlin | |
| 2010/0152950 A1 | 6/2010 | Chin et al. | |
| 2010/0152951 A1 | 6/2010 | Chin et al. | |
| 2010/0178637 A1 | 7/2010 | Lecointre et al. | |
| 2010/0211270 A1* | 8/2010 | Chin et al. | 701/44 |
| 2010/0256874 A1* | 10/2010 | Carresjo et al. | 701/48 |
| 2010/0280711 A1 | 11/2010 | Chen et al. | |
| 2010/0332266 A1* | 12/2010 | Tamir et al. | 705/4 |
| 2011/0270486 A1* | 11/2011 | Stevens et al. | 701/33 |
| 2012/0239462 A1* | 9/2012 | Pursell et al. | 705/7.38 |
| 2012/0283893 A1* | 11/2012 | Lee et al. | 701/1 |
| 2013/0046559 A1* | 2/2013 | Coleman et al. | 705/4 |

FOREIGN PATENT DOCUMENTS

| | | | |
|---|---|---|---|
| JP | 2000231326 | | 8/2000 |
| KR | 20140097669 A | * | 8/2014 |
| WO | WO 2007104982 | | 9/2007 |
| WO | WO 2009002483 A1 | * | 12/2008 |
| WO | WO 2009081234 | | 7/2009 |

OTHER PUBLICATIONS

Modeling and intelligent control design of car following behavior in real traffic flow; Khodayari, A.; Ghaffari, A.; Kazemi, R.; Manavizadeh, N.; Cybernetics and Intelligent Systems (CIS), 2010 IEEE Conf. on; Digital Object Identifier: 10.1109/ICCIS.2010.5518546; Publication Year: 2010, pp. 261-266.*

Simplified, data-driven, errorable car-following model to predict the safety effects of distracted driving; Przybyla, J.; Taylor, J.; Jupe, J.; Zhou, X.; Intelligent Transportation Systems (ITSC), 2012 15th International IEEE Conf. on; Digital Object Identifier: 10.1109/ITSC.2012.6338913; Pub. Year: 2012, pp. 1149-1154.*

ECG telemetric evaluation in Formula One drivers; Bedini, R.; Belardinelli, A.; Palagi, G.; Varanini, M.; Ripoli, A.; Berti, S.; Carpeggiani, C.; Paone, F.; Ceccarelli, R.; Computers in Cardiology 1995; Digital Object Identifier: 10.1109/CIC.1995.482658 Publication Year: 1995, pp. 353-356.*

SmartV: Intelligent vigilance monitoring based on sensor fusion and driving dynamics;Wijayagunawardhane, N.R.B. ; Jinasena, S.D. ; Sandaruwan, C.B. ; Dharmapriya, W.A.N.S. ; Samarasinghe, R.;Industrial and Information Systems (ICIIS), 2013 8th IEEE Inter. Conf. on; DOI: 10.1109/ICIInfS.2013.6732036; Pub Year: 2013, pp. 507-512.*

Variable insurance premium for safer driving: A survey result; Knoop, V.L. ; Hao Li ; van Arem, B.; Intelligent Transportation Systems (ITSC), 2011 14th International IEEE Conference on; DOI: 10.1109/ITSC.2011.6082898; Publication Year: 2011, pp. 439-444.*

MobiDriveScore—A system for mobile sensor based driving analysis: A risk assessment model for improving one's driving Chakravarty, T. ; Ghose, A. ; Bhaumik, C. ; Chowdhury, A.;Sensing Technology (ICST), 2013 Seventh International Conference on; DOI: 10.1109/ICSensT.2013.6727671; Publication Year: 2013, pp. 338-344.*

SmartV: Intelligent vigilance monitoring based on sensor fusion and driving dynamics;Wijayagunawardhane, N.R.B. et al.;;ndustrial and Information Systems (ICIIS), 2013 8th IEEE International Conference on; DOI: 10.1109/ICIInfS.2013.6732036; Publication Year: 2013, Page(s):.*

A non-intrusive multi-sensor system for characterizing driver behavior; Rodrigues, J.G.P.et al., Intelligent Transportation Systems (ITSC), 2010 13th International IEEE Conference on; DOI: 10.1109/ITSC.2010.5625250; Publication Year: 2010, pp. 1620-1624.*

New vehicle security assessment—a practical insurance approach; McCartney, C.T.;Security and Detection, 1995., European Convention on; Year: 1995; pp. 239-243, DOI: 10.1049/cp:19950505.*

Variable insurance premium for safer driving: A survey result; Knoop, V.L.; Hao Li; van Arem, B.; Intelligent Transportation Systems (ITSC), 2011 14th International IEEE Conference on; Year: 2011; pp. 439-444, DOI: 10.1109/ITSC.2011.6082898.*

MobiDriveScore—A system for mobile sensor based driving analysis: A risk assessment model for improving one's driving Chakravarty, T.; Ghose, A.; Bhaumik, C.; Chowdhury, A.; Sensing Technology (ICST), 2013 Seventh International Conference on Year: 2013; pp. 338-344, DOI: 10.1109/ICSensT.2013.6727671.*

Experimental analysis of CCA threshold self-adjusting method for EWM dissemination; Lingqiu Zeng; Le Yang; Qingwen Han; Xueying He; Ye Lei; Bin Yang; Intelligent Transportation Systems (ITSC), 2014 IEEE 17th International Conference on Year: 2014; pp. 3040-3045, DOI: 10.1109/ITSC.2014.6958178.*

Vehicle Black Box System;Kassem, A.; Jabr, R.; Salamouni, G.; Maalouf, Z.K; Systems Conference, 2008 2nd Annual IEEE Year: 2008; pp. 1-6, DOI: 10.1109/SYSTEMS.2008.4519050.*

Notice of Retraction: Analysis on application of data mining upon rate making and risk analysis in insurance; Jianbing Xiahou; Yang Mu; Computer Engineering and Technology (ICCET), 2010 2nd International Conference on; Year: 2010, vol. 2; pp. V2-450-V2-452, DOI: 10.1109/ICCET.2010.5485538.*

Research and Optimization of Crashworthiness in Small Overlap Head-on Collision; Xiao Sen; Yang Jikuang; Zhong Zhihua Measuring Technology and Mechatronics Automation (ICMTMA), 2013 Fifth International Conference on; Year: 2013 pp. 854-857, DOI: 10.1109/ICMTMA.2013.214.*

Segmentation and Clustering of Car-Following Behavior: Recognition of Driving Patterns; Higgs, B.; Abbas, M.; Intelligent Transportation Systems, IEEE Transactions on; Year: 2015, vol. 16, Issue: 1; pp. 81-90, DOI: 10.1109/TITS.2014.2326082.*

CN Office Action application No. 201210158516.X dated Jul. 28, 2014.

* cited by examiner

SYSTEM AND METHOD FOR VEHICLE DRIVING STYLE DETERMINATION

FIELD OF THE INVENTION

The present invention is related to analyzing vehicle driving styles, and producing a driving style rating for a driver of a vehicle.

BACKGROUND

Different drivers have different driving styles, and the driving styles may affect, for example, fuel economy. An aggressive driver may accelerate forward more quickly than a less aggressive driver, and may brake (creating negative acceleration) harder and faster than a less aggressive driver. A gentler, efficiency minded, or eco-friendly driver may accelerate forward more slowly or softly than an aggressive driver, and may brake more gently or gradually.

It would be desirable to provide feedback to drivers, or other systems regarding driving style, relative to other drivers. It would be desirable to provide such information using hardware such as sensors already existing in a vehicle.

SUMMARY OF THE INVENTION

In one embodiment, a system and method may collect acceleration data for a driver for a vehicle, compare the acceleration data for the driver to a set of acceleration data representing a plurality of sample drivers driving in the same type of vehicle as the vehicle, and based on the comparison, determining a driving style rating for the driver.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, throughout the specification discussions utilizing terms such as "processing", "computing", "storing", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may input vehicle data, such as acceleration data, gas pedal or usage data, or other data, and identify a driving style of the driver. A driving style may be expressed as a rating that describes a characteristic of the driving, such as aggressive, average, mild, eco-friendly, efficient, etc. Since the driving style or rating may be calculated relative to a set of sample or prior drivers, or to the driver himself, the rating or style may be a relative rating. A driving style may be expressed as a number or another indication. Data may be collected for, for example, acceleration. If the acceleration spreads detected (e.g., the distribution of the data) are relatively wide (for example, for each of a set of speed ranges, bands, or zones), the driving style rating may be defined as more aggressive. A driving style indication may be determined or provided using hardware such as sensors already existing in a vehicle (e.g., speedometer, accelerometer, etc.), and no additional hardware, beyond what is typically installed, may be required. In other embodiments, additional sensors may be installed.

Figure 1:
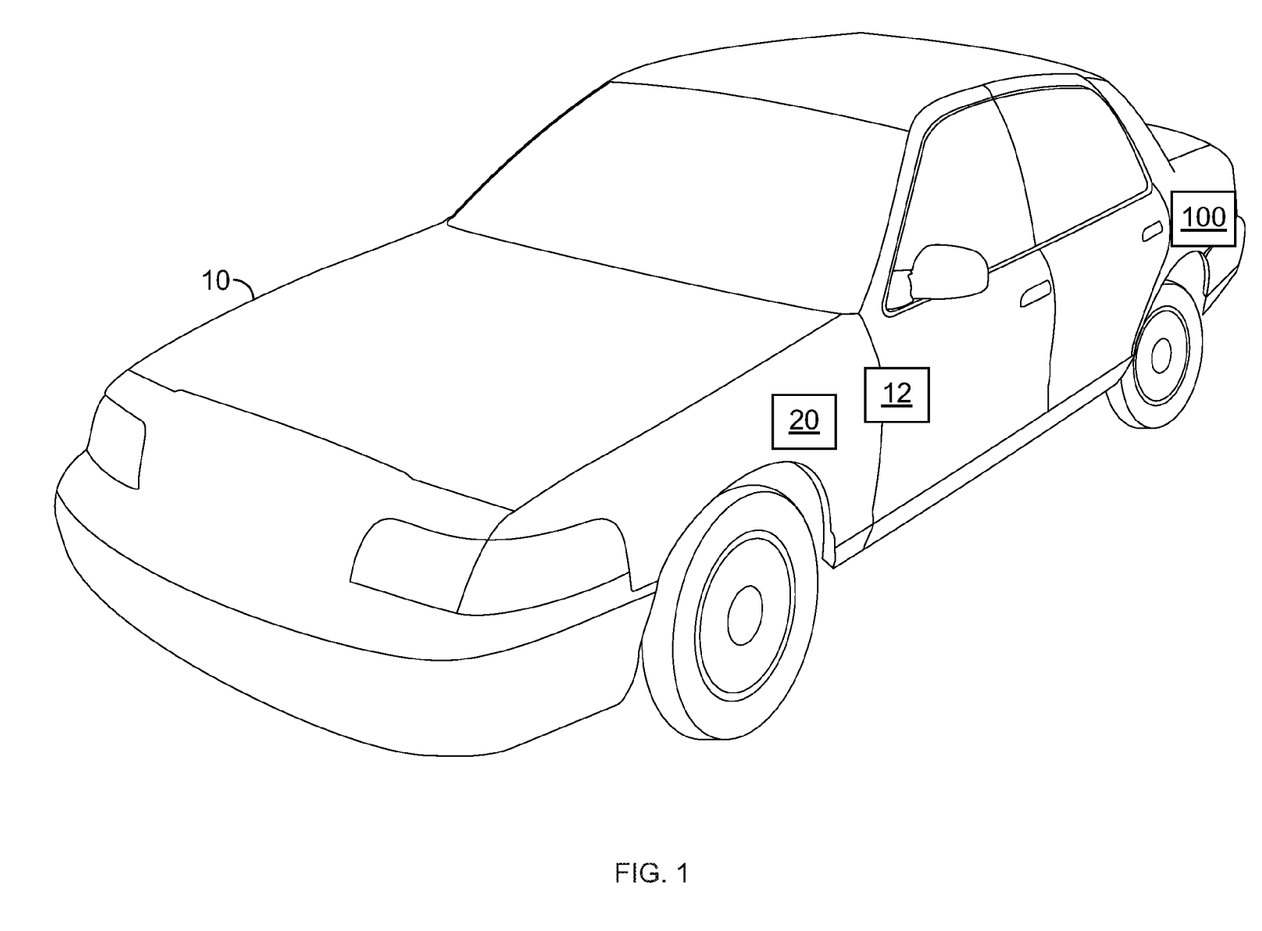
FIG. 1 is a schematic diagram of a vehicle and a driving style determination system according to an embodiment of the present invention.

FIG. 1 is a schematic diagram of a vehicle and a driving style determination system according to an embodiment of the present invention. Vehicle 10 (e.g. an automobile, a truck, or another vehicle) may include a driving style determination system 100. A speed sensor 20, as is standard on most vehicles, may record the speed or velocity of vehicle 10 may be operatively connected e.g., via a wire link or a wireless link to driving style determination system 100 (and possibly other systems). An accelerometer 12, e.g., capable determining acceleration of vehicle 10 and outputting acceleration values as a signal (e.g., a digital or analog signal) may be operatively connected e.g., via a wire link or a wireless link to driving style determination system 100. Accelerometer 12 typically detects acceleration in the forward-backwards direction relative to the typical direction of travel of the vehicle and not in a side to side or up-down direction, but other acceleration directions may be captured. More than one accelerometer may be used. When used herein, acceleration includes deceleration in the sense that a negative acceleration value indicates deceleration. In other embodiments, a gas pedal sensor capable determining the amount of displacement, deflection, depression or pressure on a gas pedal or acceleration pedal may collect data. Sensors other than or in addition to an accelerometer or gas pedal sensor may be used to driver input or vehicle data. For example, a road grade or incline sensor, a brake sensor, fuel consumption or flow sensor, gear sensor, engine speed or revolutions-per-minute (RPM) sensor, or speed sensor may be used.

In one embodiment driving style determination system 100 is or includes a computing device. In alternate embodiments, driving style determination system 100 may have all or part of its functionality remotely located (e.g., in a remote server).

Figure 2:
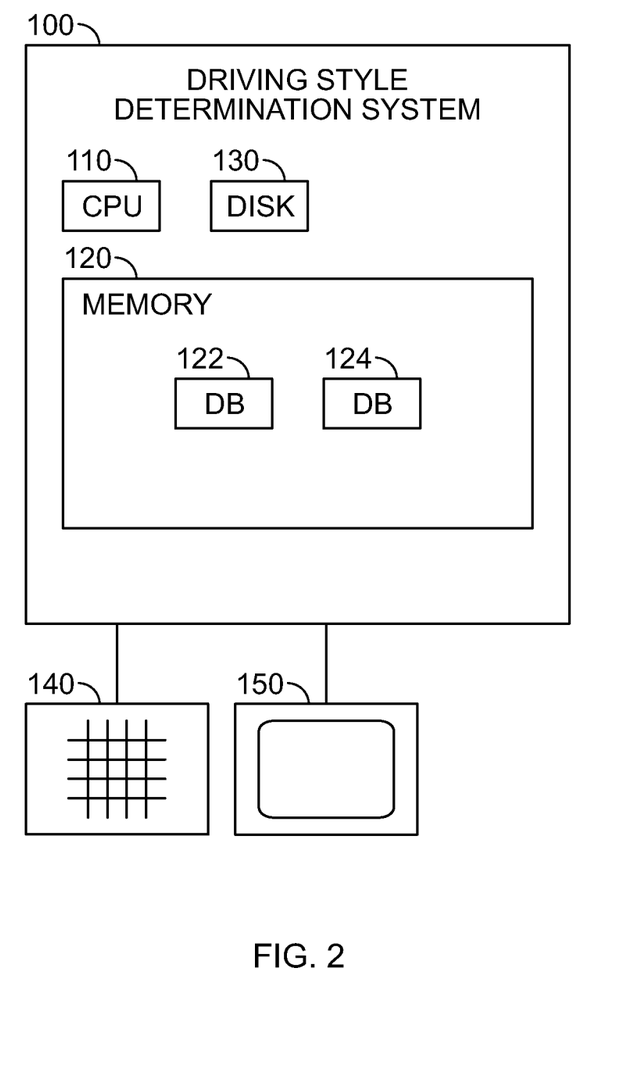
FIG. 2 is a schematic diagram of a driving style determination system according to an embodiment of the present invention.

FIG. 2 is a schematic diagram of a driving style determination system according to an embodiment of the present invention. Driving style determination system 100 may include one or more processor(s) or controller(s) 110, memory 120, long term storage 130, input device(s) or area(s) 140, and output device(s) or area(s) 150. Input device(s) or area(s) 140 and output device(s) or area(s) 150 may be combined into, for example, a touch screen display and input which may be part of system 100, and may be part of another vehicle computer system, such as a dashboard computer system. Input device(s) or area(s) 140 may be, for example, a keyboard, microphone, pointer device, buttons or knobs on a dashboard, a touch screen, or other devices. Output device(s) or area(s) 150 may be for example a display, screen, audio device such as speaker or headphones, or other device. Output device 150 may be integrated into a dashboard.

System 100 may include databases including prior driver data database 122 and specific driver database 124. Prior driver data database 122 may include data relating to a number of different drivers recorded when driving the same type of vehicle (e.g., make, model, etc.) as vehicle 10, and may be, for example, created and stored in system 100 by a manufacturer, or by other methods. For example, prior driver data database 122 may include an average and standard deviation for acceleration values in each of a number of speed bands or ranges for each of a set, e.g., 100, drivers. Database 122 may include a derivation or summary of average and standard deviation values for a number of drivers. For example, an average of average values and an average of standard deviation values, averaged across a number of drivers, may be stored for each of a number of speed bands or ranges.

In one embodiment, the data in database 122 is acceleration data typically based on an accelerometer. However, in other embodiments, average and standard deviation data may be stored in database 122 for gas pedal sensor data, brake pedal sensor data, fuel consumption or flow data, or other data.

Specific driver database 124 may include past driving information on one or more specific drivers who have used the specific vehicle 10 in order for a specific driver of vehicle 10 to compare his driving to his own prior driving in the vehicle. Specific driver database 124 may include, for example, driver identification (ID) information to enable differentiating different drivers, and past average and standard deviation for acceleration values for the driver in each of a number of speed bands or ranges. Other or different information may be stored in database 124, such as past ratings (e.g. eco-ratings). Databases may be stored all or partly in one or both of memory 120, long term storage 130, or another device. Other or different types of databases may be used.

Processor or controller 110 may be, for example, a central processing unit processor (CPU), a chip or any suitable computing or computational device. Processor or controller 110 may include multiple processors, and may include general purpose processors and/or dedicated processors such as graphics processing chips. Processor 110 may execute code or instructions, for example stored in memory 120 or long term storage 130, to carry out embodiments of the present invention.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 3A:
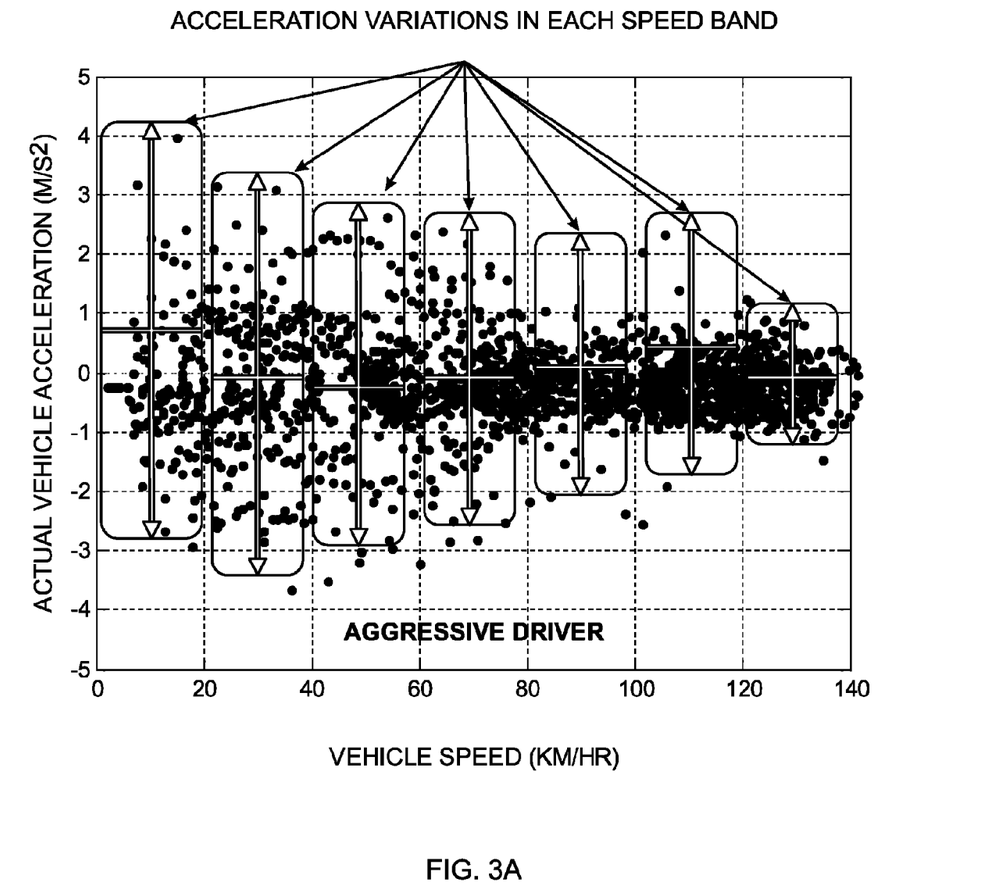
FIGS. 3A and 3B depict the distribution of acceleration data points across a set of speed ranges or bands, according to one embodiment of the invention.
Figure 3B:
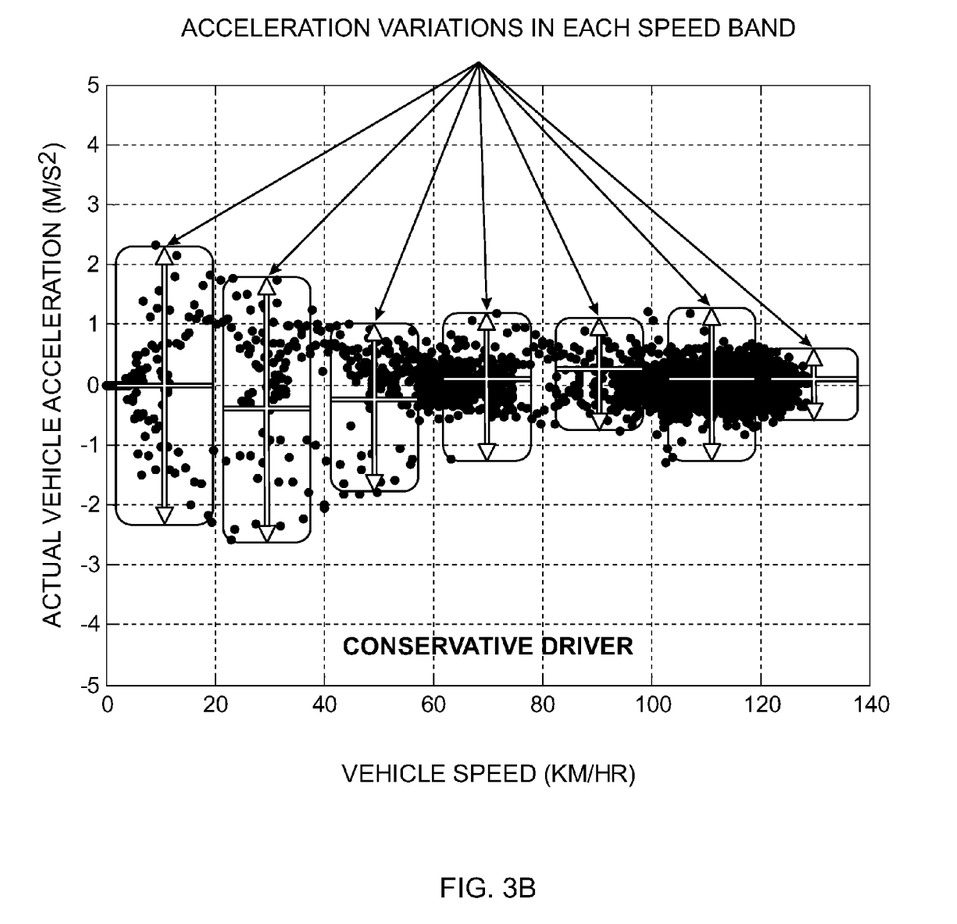

Acceleration data, and the distribution of acceleration data, may indicate the aggressiveness of a driver. FIG. 3A is an example distribution of acceleration data points across a set of speed ranges or bands, for a driver considered relatively aggressive. FIG. 3B is an example distribution of acceleration data points across a set of speed ranges or bands, for a driver considered relatively conservative or eco-friendly. FIGS. 3A and 3B show example data only, and other data may be used.

Figure 4:
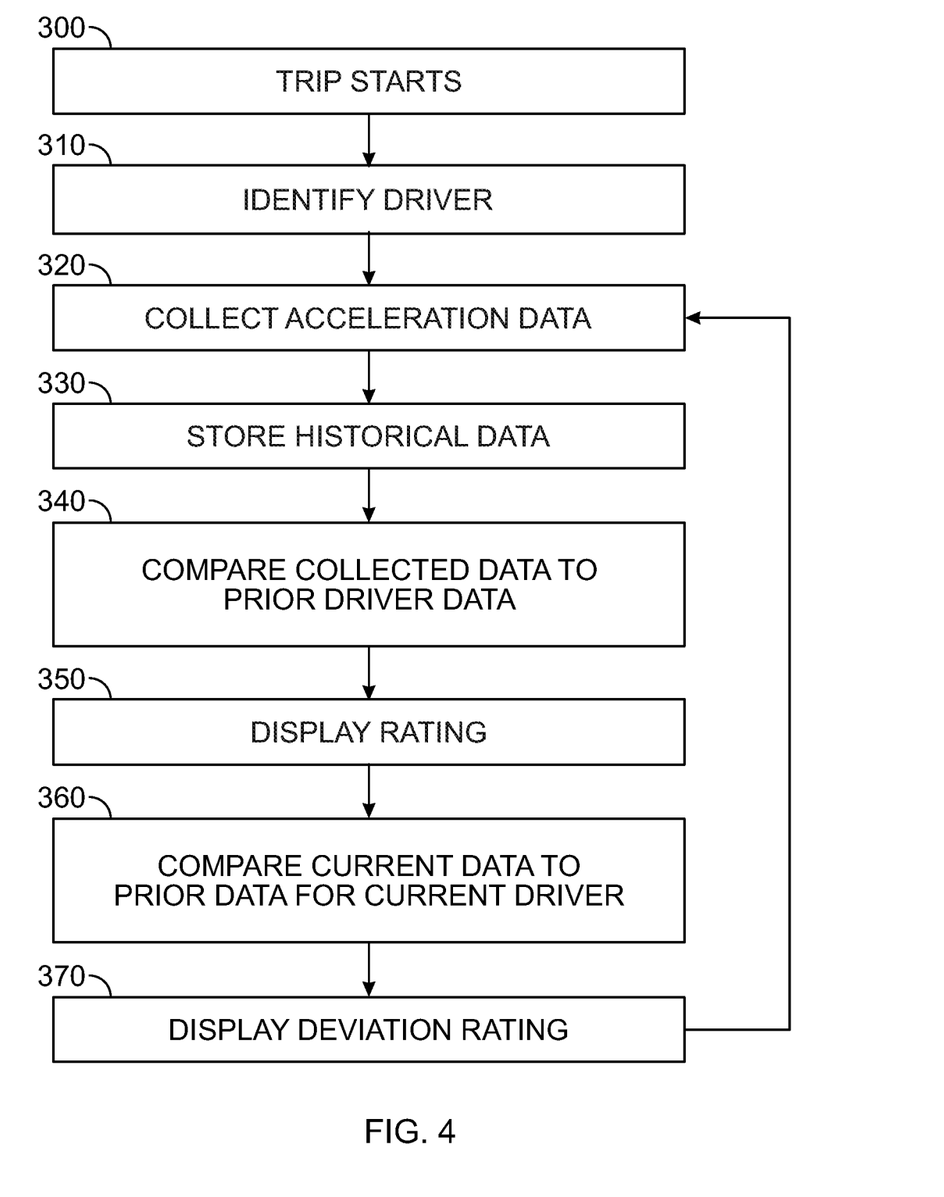
FIG. 4 is a flowchart depicting a method according to an embodiment of the invention.

FIG. 4 is a flowchart depicting a method according to an embodiment of the invention. The operations of FIG. 4 may be carried out by, for example the system described in FIGS. 1 and 2 (e.g., processor 110 executing instructions), but may be carried out by other systems and devices.

In operation 300, a driver may start a trip or session in a vehicle.

In operation 310, the driver may be identified. A number of drivers may drive a vehicle, and in one embodiment, each may be identified, and a driving history may be stored in or associated with the vehicle for each driver. A driver may be identified automatically, by querying the driver, or by other methods. A driver may self-identify (e.g., enter an identification). Vehicle data may be examined and lane change style, passing style, acceleration style, or other driving styles may be used to identify a driver. A driver token (e.g., a radio frequency identification tag) may be used. Identification of a particular driver need not be performed.

In operation 320, acceleration, speed, and/or other sensor data may be collected for the driver in the vehicle. Periodically, e.g., every 1.6 seconds, a reading may be taken from sensors such as accelerometer 12. In one embodiment, only acceleration data is used, in combination with simultaneously or substantially simultaneously obtained speed data. The speed data may be obtained simultaneously to determine in which bin or band to include acceleration or other data. In other embodiments, other data (e.g., gas pedal sensor data, brake pedal sensor data, fuel consumption or flow data) or multiple data sets may be used. The collected data may be stored, for example in a table or database, possibly specific to this drip for an identified driver, e.g., in memory 120 or storage 130. Additional data regarding a data point or data sample may be collected and stored with the sample. For example, a timestamp, road grade (angle of incline) or other information may be stored with each data point.

Each data point or sample may be validated, sanity checked, or otherwise determined to be realistic data before being processed and/or stored. Invalid, error or unrealistic samples may be discarded. Regular or periodic sampling need not be used. In some embodiments, determination of a driving style may not be done unless an acceptable threshold number of samples are collected.

In one embodiment, data points may be stored in bins or bands, according to speed. For example, seven bands or ranges of 0-20 km/hour, covering vehicle speed ranging from 0 to 140 km/hour may be used. Other numbers of bands and ranges may be used, and organizing data into bands need not be used. Each data point (e.g., a measure of the current acceleration, or other data collected by sensors) may be assigned to a band based on current vehicle speed. Speed may be detected via, e.g., speed sensor 20. Depending on the speed, the data point may be added to particular part of a table or histogram (e.g. as shown in FIG. 3). In other embodiments, other data may be used to define bands, or bands may not be used.

Adjustments may be made to the data. For example, road grade (e.g., slope or angle) may be taken into account. In one embodiment, if at the time of the collection of a data point the grade indicates uphill, a measurement of negative acceleration (deceleration) is adjusted to include as a data point only vehicle-generated deceleration using the road grade estimate, but a measurement of positive acceleration is not adjusted. If at the time of the collection of a data point the grade indicates downhill, a measurement of positive acceleration is adjusted to include as a data point only vehicle-generated acceleration using the road grade estimate, but a measurement of negative acceleration is not adjusted. The adjustment may be made, for example, by adding to the acceleration data a measure of the grade, or a grade factor (e.g. the grade factor may be sin(road slope angle), where the road slope angle is positive when travelling uphill and negative when downhill), possibly multiplied by a constant (e.g., gravity, or 9.81 meters per second squared) before storing the acceleration data in a table or database. The grade factor may be generated partially or wholly from the grade. In one embodiment the grade factor is negative when the grade is downhill and positive when the grade is uphill. Other methods of adjustment due to grade may be used, adjustment due to grade need not be used, and other adjustments may be used. For example, speed may be used to weight the importance of each data point, during data collection, or possibly during processing of data points.

In operation 330, the collected acceleration or other sensor data may be used to update prior or historical data for the individual driver driving the particular vehicle, e.g., in database 124. In one embodiment, this is done on a rolling basis; e.g., after each data point is collected. In another embodiment, at the end of each trip, a rating (e.g., eco-rating) is saved to database 124.

In operation 340, the collected acceleration or other sensor data may be compared to prior driver data (e.g., acceleration data) for other or prior drivers (driving in the same type or model of vehicle as is the current driver) during prior driving drips. Data for the driver in each of a set of speed bands may be compared to acceleration data for the sample drivers in each of a plurality of corresponding (e.g., the same) speed bands. In one embodiment, this comparison is performed by comparing current data to a summary of collected data (e.g., the mean and standard deviation for individual data points) for the drivers. In another embodiment, other summaries may be compared, or specific data points or raw data may be compared. When discussed herein, acceleration data for a driver in a vehicle means data on the acceleration of the vehicle when driven by the driver.

A rating, such as a driving-style rating or eco-rating, may be produced.

In one embodiment, this comparison is performed for each of a set of data ranges or bands, such as speed bands, and an overall rating is produced based on the comparisons or ratings for each band. In one embodiment, current data is compared to an average and standard deviation of prior data. For example, a prior driver data database (e.g., database 122) may include a mean and the standard deviation for each of 7 ranges or bands, for a number of drivers (e.g., 100 drivers). Thus the database may include 14 numbers (7 mean numbers and 7 standard deviation numbers). Other forms for prior data may be used.

Additional processing or adjustments may be made for each mean and standard deviation figure. For example, other input, such as the road grade, or the speed, may be taken into account.

In one embodiment, for each speed band, the average acceleration data for the current driver (for the vehicle driven by the current driver) may be compared to standard deviation and/or average acceleration data for a sample of prior driver (s) when driving the vehicle (or the type of vehicle), e.g., stored in database 122. For example, for each speed band, the average value (e.g. stored in the database 122), e.g. acceleration data of the sample drivers for this speed band is subtracted from the average acceleration data for the current driver on the current trip has subtracted from it. This interim number or rating may be modified or processed; for example this number may be divided by the standard deviation for the set of prior drivers for this speed band This may produce a rating, Z rating or raw rating for the current speed band for this driver, which may be further processed. An example formula used is:

$$Z = \frac{\overline{X} - \mu}{\sigma}$$

$$\text{Where } \overline{X} = \frac{1}{n}\sum_{i=1}^{n} X_i,$$

which represents the average of the n samples for this driver, on this trip, for one speed band or bin, n is the number of these samples for the current driver on the current trip, $\mu$ is the average value for the corresponding speed bin from a database representing prior sample drivers in this vehicle, and $\sigma$ is the standard deviation for the corresponding speed bin from a database representing prior drivers in this vehicle. In one embodiment, $\mu$ is the average over all the drivers of the average values for the corresponding speed bin from a database of prior drivers, and $\sigma$ is the average over all the drivers of the standard deviations for the corresponding speed. Other formulas may be used. This rating or Z-score may indicate the difference between the current driver's acceleration patterns from a set of drivers representing as a group an average. This number may for example vary from −1 to 1. Other ranges may be used and other formulas may be used. This rating or Z-score may be based on a standard deviation, or may be a version of a normalized standard deviation.

Further processing may be performed. For example, the absolute value of this Z-score or interim rating may be taken, and the value filtered (e.g., first order or second order filter).

If multiple speed bins or bands are used, the ratings for the various bands may be averaged, to produce one final eco-rating or Z-score. In one embodiment the score may have a value of 0-1 (where 0 indicates conservative and 1 indicates aggressive).

This value may be altered or normalized. In other embodiments other ranges may be produced. For example, this score may be converted to a 0-100 scale, or to one of a set of textual or color ratings (e.g. "eco-friendly", "intermediate," and "aggressive"). In addition, this value may be altered based on the speed of the vehicle. For example, if the current speed for the vehicle is over a threshold, e.g., 70 miles per hour, an adjustment may be made, for example by multiplying the rating by a weight, such as weight=1/(1+exp(−(−0.4*speedmph+30))), where speedmph is the speed in miles per hour. Other methods of altering the value may be used.

In operation 350, a rating, description or evaluation of driving style may be for example displayed to the driver, e.g., on output device or area 150. The rating may be input to other processes. The rating may be for example a number from 1-100, 0-1, or another range. For example if the scale is 1-100, 100 may be most efficient or environmentally friendly and 1 may be minimally efficient or environmentally friendly. The rating may be in other forms, for example one of a set of categories, such as "eco-friendly", "intermediate," and "aggressive", or one of a set of colors.

In step 360, the collected acceleration or other sensor data may be compared to prior data for this specific driver in this specific vehicle, e.g. as stored in database 124. In one embodiment, the calculations shown in operation 340 are used to compare current driver data to database 124 instead of prior driver data database 122, to produce a rating, description or evaluation of driving style for the driver relative to the driver on past trips, which may be termed a "deviation rating".

In step 370, a deviation rating, or a rating comparing the driver's current driving style to his historic driving style, may be produced. The rating or comparison may for example be displayed to the driver, e.g., on output device or area 150. The rating may be input to other processes. Comparison to a particular driver's own prior data need not be performed.

The process may loop back or iterate back to step 320, and provide an updated rating. In one embodiment, with each additional data point collected, the set of data points for the current driver on the current trip is updated, by adding the data point and possibly removing a data point as well (typically in a first-in-first-out manner). E.g., the earliest data point collected is removed and the latest data point added. Data need not be removed. The comparison and rating operations are then performed again, and an updated rating may be provided. In other embodiments, a rolling method need not be used, and recalculation may be performed in other manners.

Other operations or series of operations may be used.

Based on a rating, a driver may adjust his or her driving style, for example to achieve higher fuel economy. The output can be used to adjust the acceleration/deceleration profile of a cruise control system, tailored to the driver's driving style.

In one embodiment, a number of data samples or data points may be collected for database 124 in order to collect or process a meaningful amount of information. For example, for a range of speed bands or ranges (e.g., 7 speed bands, each having a range of 20 km/hour, representing data across a range of 0 to 140 km/hour), a minimum of 60 samples or data points may be collected for each band, each sample being collected every 1.6 seconds. A minimum of data samples may be collected for each band for database 124 in some embodiments before an adequate data set is deemed to be collected.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a computer or processor readable storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Features of various embodiments discussed herein may be used with other embodiments discussed herein. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method of determining a rating of a driver comprising:
    collecting, by at least one sensor, input data comprising: current road data, current speed and current acceleration, for a vehicle being driven by the driver;
    assigning the current acceleration to one of a plurality of speed bands, based on the current speed;
    storing a specific database and a collective database, wherein the specific database comprises prior acceleration data of the driver, and the collective database comprises prior acceleration data representing a plurality of sample drivers driving same type of vehicle as the vehicle during prior driving trips,
        wherein both the specific database and the collective database include, for each of the plurality of speed bands, a mean acceleration and an acceleration standard deviation (SD) of their acceleration data;
    comparing, by a processor, the current acceleration with a weighted-acceleration, the weighted-acceleration comprises weightings of:
        the current road data,
        the mean acceleration and the acceleration SD, of the current acceleration assigned speed band, of at least one of: the specific database and the collective database;
    based on one or more of the comparisons, determining, by a processor, a driving style rating for the driver; and
    displaying the driving style rating.

2. The method of claim 1, wherein the collecting of the current acceleration comprises collecting from at least one of: an accelerometer in the vehicle, speedometer and a gas pedal sensor.

3. The method of claim 1 wherein collecting the current acceleration comprises collecting during a specific driving trip, and wherein the comparing is responsive to data of prior similar driving trips.

4. The method of claim 1, wherein the vehicle is an automobile and wherein the method further comprising:
    determining an eco-driving recommendation, responsive to the driving style rating, and
    displaying the eco-driving recommendation.

5. The method of claim 1, wherein the comparing is responsive to data of a specific trip.

6. The method of claim 1, further comprising adjusting, by a processor, acceleration profile of a cruise control of the vehicle, responsive to the driving style rating.

7. The method of claim 1, wherein the comparing comprises subtracting the mean acceleration of the collective data from the mean acceleration of the specific data, responsive to the plurality of speed bands.

8. A device to determine a rating of a driver driving a vehicle comprising:
    a memory to store a specific database and a collective database, wherein the specific database comprises prior acceleration data of the driver, and the collective database comprises prior acceleration data representing a plurality of sample drivers driving in the same type of vehicle as the vehicle during prior driving trips, wherein both the specific database and the collective database include, for each of the plurality of speed bands, a mean acceleration and an acceleration standard deviation (SD) of their acceleration data; and a controller to:
collect input data comprising: current road data, current speed and current acceleration, from at least one sensor for the vehicle being driven by a driver, wherein the current acceleration is assigned to one of a plurality of speed bands, based on the current vehicle speed;
compare the current acceleration with a weighted-acceleration, the weighted-acceleration comprises weightings of:
the current road data,
the mean acceleration and the acceleration SD, of the current acceleration assigned speed band, of at least one of:
the specific database and the collective database; and
based on one or more of the comparisons, determine a driving style rating for the driver.

9. The device of claim 8, wherein collecting of the current acceleration comprises collecting from at least on of: an accelerometer in the vehicle, speedometer and a gas pedal sensor.

10. The device of claim 8, wherein collecting the current acceleration data comprises collecting during a specific driving trip, and wherein the data is responsive to data of prior similar driving trips.

11. The device of claim 8, wherein the vehicle is an automobile and wherein the controller is further configured to determine an eco-driving recommendation, responsive to the driving style rating.

12. The device of claim 8, wherein the controller is configured to compare responsively to data of a specific trip.

13. The device of claim 8, wherein the controller further configured to adjust acceleration profile of a cruise control of the vehicle, responsive to the driving style rating.

14. The device of claim 8, wherein the comparing comprises subtracting the mean acceleration of the collective data from the mean acceleration of the specific data, responsive to the plurality of speed bands.

15. A method of determining a rating of a driver comprising:
collecting, by at least one sensor, input data comprising: current acceleration and current speed, for a vehicle being driven by the driver;
assigning the current acceleration to one of a plurality of speed bands, based on the current speed;
storing a collective database, the collective database comprises prior acceleration data representing a plurality of sample drivers driving same type of vehicle as the vehicle during prior driving trips, wherein the collective database includes, for each of the plurality of speed bands, an average acceleration and an acceleration standard deviation (SD);
subtracting, by a processor, for each of the plurality of speed bands, the corresponding average acceleration from corresponding current average of the current acceleration values, to produce interim ratings;
dividing, by a processor, the interim ratings by their corresponding acceleration SD to process a rating; and
providing the processed rating to the driver.

16. The method of claim 15, wherein the collecting of the current acceleration comprises collecting from at least one of: an accelerometer in the vehicle, speedometer and a gas pedal sensor.

17. The method of claim 15, wherein the vehicle is an automobile and wherein the method further comprising:
determining an eco-driving recommendation, responsive to the rating, and
providing the eco-driving recommendation to the driver.

18. The method of claim 15, comprising determining a rating for each of the plurality of speed ranges.

19. The method of claim 18, comprising averaging the ratings of the plurality of speed ranges.

20. The method of claim 15, comprising multiplying the rating by the square root of the number of samples collected for the current driver.

21. The method of claim 15, comprising using the collected current acceleration data to update the collective database.

\* \* \* \* \*